3,265,695
MELAMINE CATALYST AND PROCESS
Elton Fisher, College Park, and Marcello T. Giachino, Ellicott City, Md., assignors to W. R. Grace & Co., New York, N.Y., a corporation of Connecticut
No Drawing. Filed June 12, 1963, Ser. No. 287,184
3 Claims. (Cl. 260—249.7)

This invention is directed to a new catalyst and its use in making melamine.

In summary, the invention comprises making a catalyst condensate by heating together a urea material and a phosphorus material at a temperature of at least 150° C. until the reactants set up solid, and then granulating the resultant catalyst condensate and using it as a catalyst in the conversion of cyanic acid vapor to melamine at low pressures (from subatmospheric pressure up to several atmospheres, e.g., 5–6) and at temperatures in the range of 325–485° C. Preferred embodiments of the invention involve (a) heating the catalyst condensate in a stream of ammonia at atmospheric pressure at about 315–485° C. to strip out any volatile material from the catalyst; (b) forming the catalyst in the presence of an inert filler to render the catalyst less friable; (c) effecting the condensation of the urea and phosphorus materials by heating the reactants at a respective mole ratio of about 7:1 at about 230° C. for about 16 hours; and (d) using the catalyst with a vapor mixture of cyanic acid and ammonia in a HNCO:NH$_3$ mole ratio of about 1:5–12. All of these modifications will be discussed in detail below.

THE CATALYST

In its simplest aspect, the catalyst is prepared by condensing a urea material (which term includes urea, biuret, cyanuric acid, and cyanic acid) with a phosphorus material. By "phosphorus material" is meant phosphorus and its compounds. The materials so defined include (besides elemental phosphorus) phosphoric acid, condensed phosphoric acids (e.g., pyrophosphoric acid, metaphosphoric acid, and hypophosphoric acid), phosphorus acid (ortho, pyro, meta, and hypo), and the salts, esters, and amides of these acids.

The following are particularly useful:

Elemental phosphorus (red, yellow, violet, or black)
Orthophosphoric acid—H$_3$PO$_4$
Potassium phosphate—K$_3$PO$_4$
Lithium phosphate—Li$_3$PO$_4$
Iron phosphate—FePO$_4$
Lead phosphate—Pb$_3$(PO$_4$)$_4$
Tin phosphate—Sn$_3$(PO$_4$)$_4$
Permonophosphoric acid—H$_3$PO$_5$
Perdiphosphoric acid—H$_2$P$_2$O$_8$
Phosphorus trioxide—P$_2$O$_3$
Phosphorus tetraoxide—P$_2$O$_4$
Phosphorus pentoxide—P$_2$O$_5$
Phosphorus oxybromide—POBr$_3$
Phosphorus oxychloride—POCl$_3$
Pyrophosphoryl chloride—P$_2$O$_3$Cl$_4$
Metaphosphoryl chloride—PO$_2$Cl
Monofluophosphoric acid—H$_2$PO$_3$F
Difluophosphoric acid—HPO$_2$F$_2$
Phosphorus diamide—HOP(NH$_2$)$_2$
Phosphine oxide—H$_3$PO
The mono-, di-, and tri-alkyl phosphine oxides.
Methylethylphenylphosphine oxide—

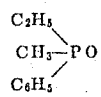

Phenyl-β-naphthylphosphoryl-l-menthylamide—

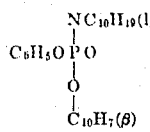

Ethyltriphenylmethylpyrophosphonate—

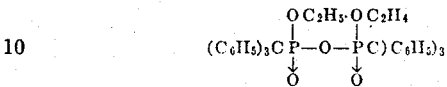

Styrylphosphinic acid—C$_6$H$_5$CH=CHPO$_3$H$_2$
Dimethylphosphinic acid—(CH$_3$)$_2$PO$_2$H
Phosphobenzene—C$_6$H$_5$PO$_2$
Ethyltriphenylmethylpyrophosphonic acid—

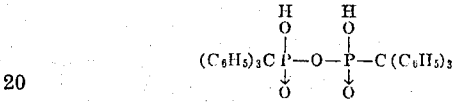

Phosphoroxybenzene—

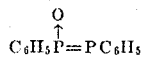

Triethylphosphine oxide—(C$_2$H$_5$)$_3$PO
Diethylphosphinic acid—(C$_2$H$_5$)$_2$PO$_2$H
Hydroxyethylphosphonic acid—CH$_3$C(OH)HPO$_3$H$_2$
Tetraethylphosphonium hydroxide—P(C$_2$H$_5$)$_4$OH
Tetramethylphosphonium hydroxide—P(CH$_3$)$_4$OH
Hexamethylphosphoramide—((CH$_3$)$_2$N)$_3$PO
Tributyl phosphate—(CH$_3$CH$_2$CH$_2$CH$_2$)$_3$PO$_4$
Phenylphosphonic diamide—C$_6$H$_5$P(O)(NH$_2$)$_2$
Phenylphosphonic dichloride—C$_6$H$_5$P(O)Cl$_2$ In making the catalyst it has been found desirable to cause it to foam during the condensation reaction. Urea causes this desirable foaming reaction because it releases numerous bubbles of ammonia during the reaction. Cyanuric acid provides less foaming, and in some cases we prefer to add a known "foamer" such as ammonium carbonate or ammonium carbamate to the reaction mixture (e.g., up to 25% by weight of the urea material) to reduce the bulk density of the catalyst. This foaming action does not give a gel type structure to the catalyst, which has, on the contrary, an extremely low surface area, of the order of 10–20 square meters/g.

We have already mentioned that an inert filler can be added to the catalyst condensate. The purpose of a filler is to give structural strength to the catalyst. This is desirable when the catalyst is used in a column several feet tall, as attrition, friability, and powdering are thereby greatly reduced. However, as already noted, the catalyst is entirely operable without the filler. When a filler is used, it is preferable to mix it in with the urea material and the phosphorus material prior to, or during, the condensation reaction as by this means the best dispersion of filler into the condensate is obtained. The to add only enough to impart mechanical strength to the amount of filler is not critical. In general it is desirable catalyst. For this purpose, about 25–50% by weight of filler based on the weight of the total solid catalyst is sufficient. Various inert fillers can be used. Quartz particles and furnace black, as elsewhere discussed, are eminently suitable. In one embodiment, the catalyst can be formed in situ on the filler; cf. Example 11, in which cyanic acid is reacted with elemental phosphorus on glass wool.

While not essential, it is desirable that the catalyst condensate (whether or not containing a filler) be stripped of volatile material before placing it in the catalyst chamber for use. A good way to do this is to expose the granulated catalyst to a stream of ammonia until volatile material substantially ceases to come off the catalyst. This volatile material contains substantial amounts of urea (along with melamine), and, by reason of this urea, contaminates the product unless pre-stripped before use. The same end result is obtained, however, in operating the melamine synthesis unit without pre-stripped the catalyst, provided the final melamine product is purified of the urea coming over in the initial hours of the synthesis. In general, when using this embodiment, it is desirable to heat the catalyst in a stream of ammonia at 315–480° C., or typically about 400° C., for about 12–48 hours. After 48 hours, the amount of volatile material still coming over is quite small.

As used in the specification and claims, the term "urea-phosphorus catalyst" is intended to describe any of the catalysts produced as described in this section.

In general, depending upon the rate of heat input, the nature of the reaction vessel, etc., the condensation reaction time is typically about 16 hours. As already noted, reaction times somewhat less than optimum can be used, e.g., 2 hours, with the sole disadvantage that the catalyst condensate tends to liquefy slightly in the catalyst chamber under melamine-forming conditions. However, the liquefaction stops in a few minutes and does not disturb the activity of the major part of the catalyst, which remains a solid. The catalyst reaction mixture can be maintained at the condensation temperature for many hours longer after the material sets up solid without undue harm to the catalyst, e.g., 18 hours or more. However, it is pointless to continue heating much beyond the time necessary to solidify the catalyst.

In making the catalyst condensate, the urea material: phosphorus material mole ratio can be varied over fairly wide limits, e.g., 2 to 50:1, respectively.

CATALYST USE

Example 1

A catalyst was prepared by heating urea (10.5 kg.) and 85% $H_3PO_4$ (2.7 kg.) to about 230° C. for about 16 hours; the product (5.1 kg.) was charged into a reactor (made from a 4″ steel pipe) where it was supported on a perforated metal plate, and heated (ca. 400° C.) for 48 hours in a stream of $NH_3$ (450 g./hr.). Catalyst weighing 1.84 kg. and analyzing 9.2% C, 2.6% H, 9.7% N, 29.1% P, and 49.4% O (by difference) was recovered. Volatilized material weighing 688 g. collected in a cool product receiver down stream the hot reactor; this was discarded.

The catalyst was used in a reactor made from a 42″ section of 2″ steel pipe. One end was threaded and equipped with a quick opening gate valve. The unit was operated in a vertical position so that the capped end was the top of the reactor. An ammonia inlet port was provided on the side of the pipe adjacent to the cap. A retaining ring holding a perforated plate that supported the catalyst bed was placed on the inside of the pipe about 14″ from the bottom. A second retaining ring supporting a perforated plate that held steel chips (which served as a cyanuric acid vaporizer to provide HNCO vapor) was placed inside the pipe about 15″ from the top. The exterior of the pipe was wrapped with 2 sections of electrical resistance wire. One heating element extended from about 3″ below the top of the reactor to about 1½″ below the retaining ring that supported the steel chips used to vaporize cyanuric acid. This element supplied heat to the vaporizer which was maintained in the temperature range of approximately 415–425° C. The second heating element extended from 1½″ from the bottom of the first element to within about 12″ of the bottom of the reactor. This element supplied heat to the catalyst bed which was operated in the temperature range of about 385–395° C. The lower (unheated) portion of the reactor stayed at a temperature (ca. 95° C.) low enough to permit the deposition of melamine at atmospheric pressure. A 308 ml. (143 g.) portion of catalyst was charged into the catalyst chamber. This catalyst was then conditioned by heating at 385–395° C. for 16 hrs. (after adding 4 g. of crude cyanuric acid to the reactor) while passing a stream of ammonia (56 g./hr.) through the unit. Subsequent to this conditioning, the lower end of the reactor (melamine receiver) was scraped out, and the product was discarded before starting the first run of a series. Crude cyanuric acid was fed to the reactor by dropping a 4 g. portion through the gate valve every 30 minutes. The gate valve was opened and closed quickly to avoid loss of vapor. Ammonia sweep gas was fed at 56 g./hr. Pressure on the feed side of the catalyst bed was about 5 atmospheres. A series of 3 consecutive 16 hr. runs was made. A total of 128 g. crude cyanuric acid was fed during each run of this series. Product was removed after each run, freed of most of its carbamate by heating, cooled, weighed, and analyzed:

| Run No. | Product Weight, g. | Melamine Content, Percent | Conversion, Percent of Theory |
|---|---|---|---|
| 1 | 99 | 62 | 79 |
| 2 | 73 | 53 | 55 |
| 3 | 103 | 48 | 70 |

These data correspond to a 3 run conversion of 68% of theory.

Where "crude cyanuric acid" is used as feed in these examples, the term refers to cyanuric acid containing minor amounts of ammelide, biuret, and urea. Whereas 100 g. pure cyanuric acid will give (theoretically) 47.4 g. melamine. 100 g. of the crude cyanuric acid used herein will give theoretically 54 g. melamine, mainly on account of its ammelide content, and the latter standard is used in calculating yields wherever the feed is crude cyanuric acid.

Example 2

A second catalyst was prepared by heating urea (5 kg.) high abrasion furnace black (1 kg.), and 85% $H_3PO_4$ (1.85 kg.) to 230° C. for about 16 hrs. The product weighed 4.1 kg. A portion of this material (3.1 kg.) was placed in 2″ steel reactors and heated (ca. 400° C.) for 48 hrs. in a stream of $NH_3$. Catalyst weighing 1.8 kg. and analyzing 42.6% C, 2.2% H, 18.3% N, 20.6% P, and 16.3% O (by difference) was recovered, and volatilized material weighing 136 g. collected in the product receiver down stream. The volatilized material was discarded. The catalyst showed very good mechanical properties including resistance to attrition and packing.

This catalyst was tested using the apparatus and procedure of Example 1, but modified by using a series of 6 runs. The catalyst charge had a volume of 308 ml.; it weighed 117 g.

| Run No.: | Conversion, percent of theory |
|---|---|
| 1 | 80 |
| 2 | 61 |
| 3 | 87 |
| 4 | 74 |
| 5 | 82 |
| 6 | 97 |

These results correspond to a cumulative conversion of 80% of theory.

Example 3

To carry out the process using urea as a source of cyanic acid and ammonia, a vertical steel reactor, 4″ I.D. x 5′ high, equipped with external electrical heaters was used as a fixed bed reactor. The top of the reaction cylinder was sealed off except for an inlet tube for molten urea through the top and a side arm at the top for introduction of $NH_3$ sweep gas. About 20″ down from the top was positioned a supported packing of steel chips (the "vaporizer"), maintained at a temperature high enough (suitably 355–455° C.) to vaporize urea rapidly to an equimolar vapor mixture of $NH_3$ and HNCO. About the middle of the lower third of the tube was the catalyst chamber. The catalyst was maintained as a fixed bed supported by a perforated plate. The bottom of the steel cylinder emptied into a melamine collection vessel, the walls of which were maintained at a temperature cool enough to condense melamine from the effluent vapors but hot enough to avoid condensation of most of the ammmium carbamate (ca. 95° C.). Condensed melamine product was periodically scraped from the walls of the collection vessel. Using 1.1 kg. of the catalyst described in Example 1, molten urea at about 150° C. was pumped at a rate of about 150 g./hr. into the top of the reactor while feeding $NH_3$ via the side arm at 450 g./hr. The catalyst chamber was maintained about 385° C. and the urea vaporizer at about 425° C. The catalyst was conditioned by operating for 24 hours; volatile product formed during this period was discarded. Following the conditioning period the run was started and maintained for 48 hours. A total of 7.10 kg. of urea was fed during this period. The pressure of the $HNCO-NH_3$ feed was about 5 atmospheres. Product weighing 2.75 kg. and analyzing 76% melamine was collected. This corresponds to a conversion of 84% of theory.

Example 4

A catalyst was prepared by condensing 500 g. cyanuric acid with 300 ml. 85% $H_3PO_4$ by the procedure of Example 1, heating the mixture at 155–235° C. until it solidified.

Using the apparatus of Example 1, 357 g. of the cyanuric acid-$H_3PO_4$ condensate so prepared was placed in the catalyst chamber. The catalyst occupied a volume of 308 ml. While in place in the catalyst chamber, the catalyst was conditioned by pre-treatment with $NH_3$ for 16 hrs. under reaction temperatures. At the beginning of this period 4 g. of crude cyanuric acid was fed to the catalyst while it was being conditioned. All volatile material collected during the conditioning period was discarded. Crude cyanuric acid was then fed to the reactor at a rate of 8 g./hr. to start the series of runs. The cyanuric acid decomposer section was maintained at 415–425° C. The reaction was run by the general procedure of Example 1, using $NH_3$ sweep gas at the rate of 56 g./hr. Three 16 hr. runs were made for a total of 48 hrs. The first 16 hr. run gave a 34% conversion, the second 16 hr. run a 27% conversion, and the third run, 34%. The cumulative conversion was thus 33%.

Example 5

A catalyst was prepared by heating together 200 g. urea, 200 g. of sodium hexametaphosphate, plus a filler of 200 g. of quartz (ca. 10 x 30 mesh) at a temperature of about 205–230° C. until the mixture solidified, which required about 8 hours.

The material resulting from this condensation reaction was then crushed and screened, discarding material coarser than 8 mesh and finer than 50 mesh. Of the material in the 8–50 mesh range, 196 g. was used in the catalyst chamber under conditions substantially identical to those of Example 1. The cumulative conversion for a 48 hr. period was 29%.

The quartz used as a filler in the foregoing urea has substantially no pore volume, and area measurements (square meters per gram) showed that it had no internal microcellular structure of the gel type, but rather had a surface area of only about $\frac{1}{20}$ of that of silica gel.

Example 6

A catalyst was prepared by heating together 480 g. urea with 120 g. hexamethylphosphoramide until the mixture solidified. This was done at about 205–230° C. for about 4 hrs. The catalyst was then crushed and screened as in the preceding example.

168 g. of catalyst was used in the apparatus and with the technique of Example 1 except the total reaction time was 32 hrs. and the catalyst was not preconditioned by passing $NH_3$ over it. The cumulative conversion for this reaction was 73%.

Example 7

To prepare the catalyst, 848 g. urea, 315 g. of 85% phosphoric acid, and 339 g. quartz (10–30 mesh) were heated to about 230° C. for 16 hrs. This was repeated for an additional three batches to give a total of 3.3 kg., 1.8 kg. of which was treated with $NH_3$ (56 g./hr.) in the 2" reactor of Example 1 at 400° C. for 48 hrs., to strip the catalyst of volatile material. The final weight of the catalyst was 1.5 kg. Of this, 330 g. was used in a 48 hr. run by the technique of Example 1, for an over-all conversion of 51% of theory.

Example 8

A catalyst was prepared by heating 485 g. of urea and 245 g. of tributyl phosphate (ca. 200–230° C.) until the mixture solidified (ca. 3 hrs.). Catalyst weighing 270 g. was obtained. A 308 ml. (203 g.) portion of this catalyst was placed in a 2" reactor and used according to the procedure of Example 1. During the conditioning period 103 g. of material collected in the product receiver; this materail was discarded. A 48 hr. run was then made, and product containing melamine equivalent to a conversion of 44% of theory was obtained.

Example 9

In one run, the catalyst filler used was magnesium powder 1000 g. of urea, 370 g. 85% $H_3PO_4$ and 200 g. Mg powder were heated at 230° C. for 16 hours to make the catalyst. 135 g. of the product was used in three 16-hour runs by the procedure of Example 1 to give an over-all conversion of 43%.

Example 10

The following example was made as a control to determine the amount of melamine that could be made in the reactor without any catalyst. In this run the catalyst chamber (empty) was maintained for 48 hours at a temperature in the range of 385–390° C. The feed rate of crude cyanuric acid was 8 g./hr. The $NH_3$ feed rate was 56 g./hr. The decomposer temperature was 415–420° C. Under these conditions a total of 384 g. of crude cyanuric acid was fed to the reactor, giving a product containing melamine in an amount equal to a conversion of 13% of theory.

Example 11

The apparatus was a vertical Vycor glass tube 1" in diameter by 30" long, wrapped in its circular portion (for about 18") with electrical resistance wire.

To make a control run, the center heated area was packed loosely with glass wool (no catalyst). The furnace was brought up to operating temperature of 725° F. and then crude cyanuric acid was dropped on to the top of the glass wool plug at the rate of 1 gram every 2 hours. Ammonia was fed simultaneously through the furnace at the rate of 5 grams per hour. Over a period of 14 hours, 0.03 gram of melamine was made, corresponding to 8% of theory.

A catalyst was then prepared in situ by the reaction of red elemental phosphorus with mixed ammonia and cyanic acid vapors. The phosphorus (15 grams) was placed in alternate layers with glass wool support in the foregoing apparatus, and then a melamine run was made using the conditions of the foregoing control run. During a run of 14 hours, the yield of melamine was 1.5 grams, a conversion of 40% of theory.

Example 12

The condensate catalyst was made by heating at 300–350° F. for 3 hours a mixture of 50 grams of urea with 5 grams of red phosphorus. Following this initial heating step, the mixture was then heated for 2 hours at 750–850° F., after which the resulting condensate (38.9 grams) was recovered and heated in a stream of ammonia (5 g./hr.) for 6 hours at 725–750° F. This step gave 13 grams of product, which was then placed on a glass wool support in the apparatus of Example 11 and the melamine synthesis was then run for 42 hours under the conditions of Example 11. The yield of melamine was 8.4 grams, a conversion of 75%.

Example 13

A catalyst was made by heating together 250 grams of biuret with 93 grams of 85% aqueous $H_3PO_4$, at 400–450° F. for 16 hours. For further conditioning, the resulting catalyst condensate was heated for 48 hours in the melamine reactor of Example 1, at 725° F. with ammonia at the rate of 56 grams per hour. This treatment gave a product weighing 89 grams with a bulk volume of 125 cc. All of this catalyst was then charged into a second identical melamine reactor where it was then used as a melamine catalyst with the same conditions of feed, ammonia sweep-gas and temperature as set forth in Example 1. Three 16-hour runs were made with a cumulative conversion to melamine of 35% of theory.

Example 14

A catalyst was prepared by heating together a mixture of 100 grams urea, 200 grams of high abrasion furnace black and 315 grams of phosphonitrilic chloride trimer, $(PNCl_2)_3$, at 400–450° F. for 16 hours. The resulting crude catalyst condensate was then further treated in the 2″ reactor of Example 1, in a stream of ammonia at the rate of 56 grams/hour at 725° F. for 48 hours. This treatment gave as the final catalyst a product weighing 128 grams and having a bulk volume of 290 cc. All of this catalyst was charged to an identical 2″ reactor, and was used in a melamine synthesis operation under the same conditions as described in Example 1. Three 16-hour runs gave a cumulative conversion to melamine of 72%.

Example 15

A catalyst was prepared by heating together a mixture of 185 grams $H_3PO_3$ and 1000 grams urea at 400–450° F. for 16 hours. The resulting crude condensate was then further conditioned by heating it in the 2″ reactor of Example 1 for 48 hours at 725° F. with ammonia being fed at the rate of 56 grams per hour. Of the resulting conditioned catalyst, a 308 cc. portion was transferred to an identical 2″ melamine reactor, and a melamine run was made under the same conditions described in Example 1. Three 16-hour runs gave a cumulative conversion to melamine of 51% of theory.

We claim:
1. The method of preparing melamine that comprises passing cyanic acid-ammonia vapor feed over a urea-phosphorus catalyst at a temperature of 325–485° C. and a pressure ranging from sub-atmospheric to about 6 atmospheres.
2. The method according to claim 1 in which the ammonia is in molar excess over the cyanic acid.
3. The method according to claim 2 in which the reaction temperature is about 425° C., the cyanic acid:ammonia mole ratio is about 1:5–12, the feed is passed over the catalyst at a pressure of about 5 atmospheres, and the melamine-containing vapor product is discharged at substantially atmospheric pressure.

References Cited by the Examiner

UNITED STATES PATENTS

| | | | |
|---|---|---|---|
| 2,338,987 | 1/1944 | Watzel | 252—175 |
| 2,776,286 | 1/1957 | Lobdell | 260—249.7 |
| 3,054,796 | 9/1962 | Fisher et al. | 260—249.7 |
| 3,108,999 | 10/1963 | Shaver | 260—249.7 |

WALTER A. MODANCE, *Primary Examiner.*

NICHOLAS S. RIZZO, *Examiner.*

JOHN M. FORD, MARION W. WESTERN,
*Assistant Examiners.*